FIP8102 XR 2,803,703
[redacted]
Aug. 20, 1957 C. W. SHERWIN 2,803,703
MAJORITY VOTE DIVERSITY SYSTEM
Filed Dec. 16, 1952 2 Sheets-Sheet 1
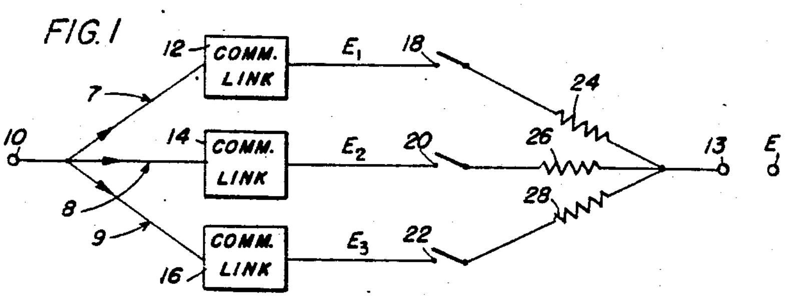
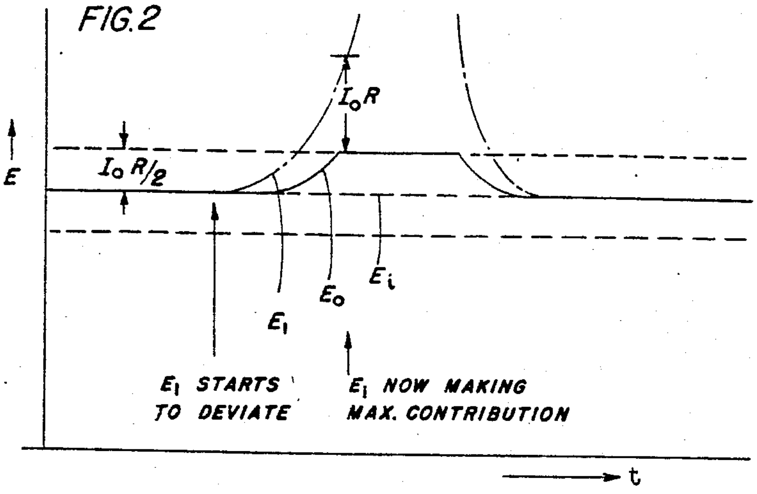
FIG.3
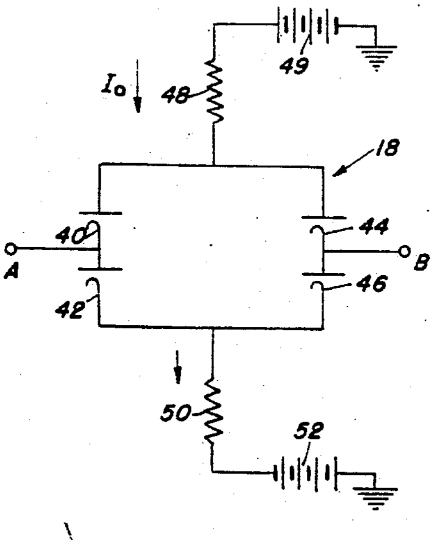
INVENTOR:
CHALMERS W SHERWIN
BY
ATT'YS

MAJORITY VOTE DIVERSITY SYSTEM

Filed Dec. 16, 1952 2 Sheets-Sheet 2

INVENTOR:
CHALMERS W. SHERWIN
BY D. C. Snyder
R. W. Wonnell
ATT'YS

United States Patent Office 2,803,703

Patented Aug. 20, 1957

2,803,703

MAJORITY VOTE DIVERSITY SYSTEM

Chalmers W. Sherwin, Champaign, Ill., assignor, by mesne assignments, to the United States of America as represented by the Secretary of the Navy Application December 16, 1952, Serial No. 326,222

4 Claims. (Cl. 178—70)

This invention relates to coupling networks; more particularly, this invention relates to a coupling or communication circuit having for its purpose the improvement of reliability of such circuits.

One of the major problems facing the electronic industry is one of improving the reliability of electronic circuits. Since the safety of personnel and equipment is often dependent upon satisfactory operation of electronic control equipment, it is apparent that circuit reliability is of extreme importance.

The basic theory of the invention is one of duplicating the number of channels which a given signal traverses, so that failure in any one channel will not prevent any signal from reaching the desired location. The idea of duplicating the number of communication channels to improve reliability, of course, is not in itself a novel or inventive concept. The invention goes beyond this basic concept by providing a multichannel system having three or more channels which include an averaging circuit for providing an output signal which is the average of the signals in only the channels which are in substantial agreement, but which rejects those channel signals which are substantially different from the desired signal, so that the undesired signal does not contribute to the average signal produced by the circuit above referred to.

Suppose, for example, a communication link must be very reliable, so that it has three different independent channels all designed to transmit the same signal. Suppose, further, that one of the channels is jammed or fails completely. The circuit here described will instantaneously disconnect the deviating channel and follow the other two, if they agree between themselves. It will reject the center value if all three disagree. This "majority vote circuit" will work with any number of channels from three up, but will not work with only two, since there is no majority when the two disagree. Thus, the circuit of the present invention is essentially a new method of averaging data. It is particularly useful when large errors occur in the data from one source. It differs from simple averaging, since a strongly deviating signal automatically disconnects itself (or sharply limits its contribution) rather than merely shifting the average value. If the simple process of averaging can be called an old method, the difference characterizing the new method is clear. The new method does, in fact, average several inputs as long as the inputs nearly agree, but when a minority appreciably deviates from the majority, the average is no longer performed. Rather, the minority is disconnected. In short, the new method discards the large deviant.

The invention uses only the actual signals from the several channels and does not need to inquire into the cause of failure, such as large noise, squeaks, jamming, or complete circuit failure. It does not need to anticipate large errors or failures to be effective; it acts instantly to suppress contribution of the deviating minority. Thus, its advantages are most noticeable when total failure or jamming of a channel is likely. Its principal advantages are the improvement of the overall reliability of the communication system.

In brief, the invention comprises a communication or coupling link having at least three channels. At the output of the channels, there is a circuit which (1) averages three outputs if they are approximately in agreement, (2) follows any majority of signals that agree and rejects the deviant values, or (3) follows the center value if all of the signals disagree. This majority type of circuit to be described is simple, using only diodes and resistors.

Accordingly, one object of the invention is to provide a novel coupling or communication network which substantially improves the reliability of the communication link, so that failures caused by component failures or by noise generated within the circuit will be substantially reduced.

A further object of the invention is to provide a novel coupling or communication network which is of simple and economical construction for improving circuit reliability.

A still further object of the invention is to provide a novel multichannel communication network with its output circuits in a manner such that failure of one circuit to properly duplicate the applied signal will not affect the resultant output from the majority of the other channels whose signals are in substantial agreement.

Other objects and features of the invention will become more apparent upon making reference to the specification, claims, and drawings wherein:

Fig. 1 is a simplified block diagram of the system comprising the invention;

Fig. 2 is a graphic diagram illustrating the operation of the circuit of Fig. 1;

Fig. 3 is a schematic diagram of the signal limit switches which are shown in Fig. 1;

Figure 4:
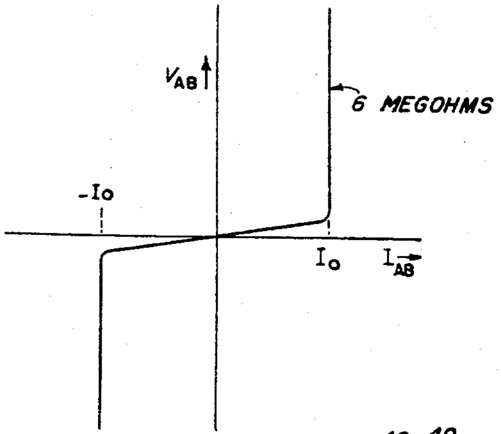
Fig. 4 is a curve showing the voltage and current characteristics of the circuit shown in Fig. 3.

All control systems involve the transmission of information from one point to another. Often the intermittent or total failure of the communication link is a serious limitation to reliability of the whole system. One solution is to improve the inherent properties of the link itself. If this proves too difficult for one reason or another, a solution using redundance may be practical. This solution is to parallel ordinary type links, so that a failure of one or more links will not affect the operation of the whole control system. If the nature of the expected failure is know beforehand, the equipment can be designed to sense this condition and automatically disconnect the defective path. If, however, there is no way of predicting the exact nature of the failure one needs a general purpose judgment device or "brain" that can cope with a number of different types of failures. The device described here performs this function in a very simple manner. It essentially takes a "two out of three" vote and automatically rejects the deviant value. This process is very rapid, limited only by the bandwidth (about one mc./sec.) of the system. Thus, a new judgment is made about every microsecond.

Referring now to Fig. 1 which shows a simplified block diagram of the invention, the invention broadly includes three separate parallel communication channels 7, 8, and 9 between the input circuit at 10 and an output circuit at 13. The circuit channels include suitable communication links 12, 14, and 16, respectively, coupled in series with current limit switches 18, 20, and 22, respectively, which, in turn, are in series with load resistances 24, 26, and 28, respectively. If noise or some other failure causes one channel to deviate from the other two, the current limit switch in that particular channel opens, limiting the contribution of the deviant signal. The outputs of all three circuits are so related that a voltage, which is the average of the voltages of the agreeing channels, will appear at point 13 in the output circuit. If, however, one of the channels is disconnected due to the fact that its signal deviates substantially from the signals of the other channels, the average value of the signal at point 13 will not be affected very much by the substantially deviating signal.

Suppose, first, that all three channels give identical signals to the load resistances 24, 26, and 28. If the output signal goes into a very high impedance load, there is little, if any, current in any of the load resistances 24, 26, and 28, and, thus, very little current passing through the switches 18, 20, and 22. Now suppose that some distortion or noise appears in the upper channel. This channel tries to change the output voltage in the direction of its own deviation. This causes switch 18 to conduct some current I (and the other two switches to each conduct I/2). As long as the current I is below a certain amount $I_0$, which will be later described, the output signal at point 13 is just an average of the three inputs. However, when the current I exceeds the given value of the current $I_0$ to be described, the upper channel contributes only a fixed current equal to the latter of a value causing a voltage drop equal to the product of this current times the value of load resistance 24 to appear across its load resistance and one-half of this amount to appear across the other two load resistances. Thus, the voltage across point 13 in the output circuit is displaced from its true value by an amount of one-half of the voltage drop occurring across the load resistance of the channel having the large deviant signal. This sequence is shown schematically in Fig. 2 wherein the symbol $I_0$ indicates the maximum limit of current which a current limit switch will pass.

For this case, the input signal $E_1$ is assumed to be a constant value, although the circuit works for changing values of $E_1$.

This circuit obeys the following rules:

(1) If:

$$|E_0-E_1|<I_0R$$
$$|E_0-E_2|<I_0R$$
$$|E_0-E_3|<I_0R$$

then $E_0=(E_1+E_2+E_3)/3$. Thus for small deviations the circuit simply averages the three output signals.

(2) If:

$$|E_0-E_1|>I_0R$$
$$|E_0-E_2|<I_0R$$
$$|E_0-E_3|<I_0R$$

then $$E_0=\frac{E_2+E_3}{2}\pm(I_0R)/2$$

That is, the circuit averages those two values which are close to agreement, and then adds a shift in $E_0$ of amount $(I_0R)/2$ in the direction of the deviant signal. Thus, it "remembers" in which direction the one channel deviated.

(3) If all the channels disagree, (i. e. if $E_1$, $E_2$, and $E_3$ all differ by more than $I_0R$) then $E_0$ follows the center value. This is easily seen by noting that the positive deviant and the negative deviant produce equal and opposite currents to the $E_0$ terminal, leaving it completely under the control of the one closed switch. No matter how rapidly the input voltages reverse order, $E_0$ will always follow the center value.

Reference should now be made to Fig. 3 which shows a schematic diagram of a current limit switch which is preferably used for switches 18, 20, and 22 in Fig. 1. The input and output terminals A and B correspond to the input and output circuits 10 and 13 shown in Fig. 1. The current limit switch shown in Fig. 3 is an electronic circuit which includes a bridge circuit of four diodes 40, 42, 44, and 46, wherein two diodes 40-42 are connected in series in current-aiding relationship (i. e. an anode of one diode connected to the cathode of the other) across the other two diodes 44-46 similarly arranged. Connected to the anode of the uppermost diodes 40 and 44 is a series circuit of a high resistance 48 and a source of positive direct-current voltage 49. The circuit connected to the cathodes of the lower diodes 42 and 46 is almost identical to that just described, so that the circuit is a symmetrical one, so that a resistance 50 connected to the cathode of diodes 42 and 46 is equal in value to the resistance 48 just described. This latter resistance is connected in series with a source of direct-current voltage of the same magnitude as voltage source 52 just described but of opposed polarity. The input terminal A is connected to the junction point of the two diodes 40 and 42 of one of the series arms. The output terminal B is connected to the junction point of the diodes 44 and 46 in the other arrm of the bridge. The voltage-current characteristics of the switch circuit shown in Fig. 3 is shown in Fig. 4. As there shown, the difference in voltage and current between the point A and the point B may vary over narrow limits from a negative to a positive value. However, when the magnitude of the current between points A and B exceeds a given value $I_0$, two of the diodes in the bridge open, disconnecting this channel or switch circuit from A to B, and the current in the output circuit is limited to the fixed value $I_0$. Switches 18, 20, and 22 likewise operate to limit the current that any one channel can contribute to the output signal.

It should be understood that there are other types of switches than the electronic arrangement just shown which can perform the above function, and the broad aspect of this invention should not be limited to the specific preferred switch arrangement just described.

Figure 5:
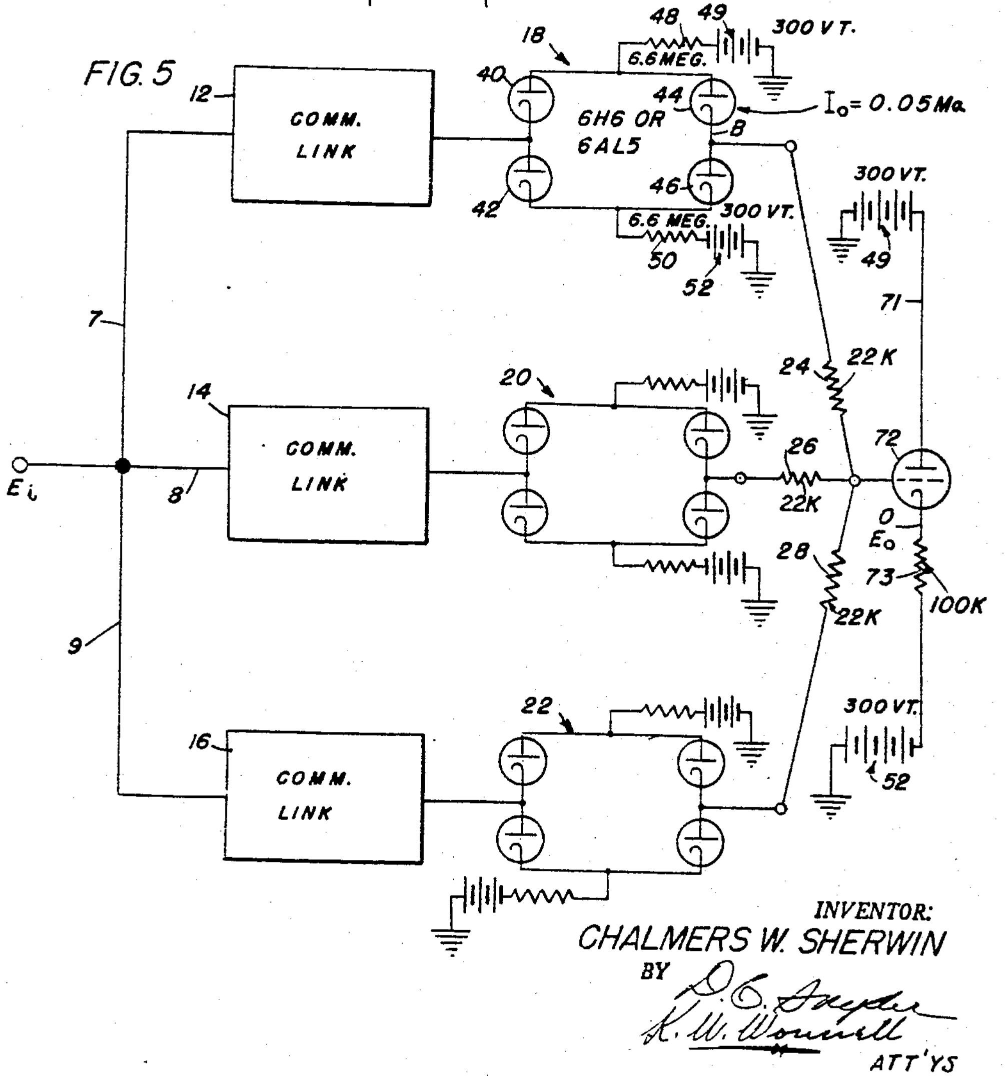
Fig. 5 is a schematic diagram of a specific embodiment of the invention.

Reference should now be made to Figure 5 which shows a specific embodiment of the invention. The general circuit arrangement there shown is identical to that shown in Fig. 1. Each of the channels there shown includes switch circuits which are identical to the circuits just described in connection with Fig. 3. The communication links 12, 14, and 16, which may be a radio link or one or more radio amplifiers, feed the input to the switch circuits 18, 20, and 22, respectively. Connected to the output of the switch circuits 18, 20, and 22 are resistances 24, 26, and 28, respectively, as described in connection with the block diagram of Fig. 1. The junction of these three resistances is connected to the grid of a triode tube 72 of a cathode follower 71 of conventional design but having the anode connected to positive direct-current voltage 49 and the cathode load resistor 73 connected to negative voltage source 52. The output is taken across cathode resistor 73.

Representative circuit values will be given for one of the channels shown in Fig. 5, it being understood that each channels has identical circuit parameters:

| | |
|---|---|
| $R_{48}$, $R_{50}$ | 6.6 megohms. |
| $R_{24}$ | 24,000 ohms. |
| $R_{73}$ | 100,000 ohms. |
| Tubes 40, 42, 44, 46 | 6H6 or 6AL5. |
| Tube 72 | 6SL7. |
| Voltage source 49 | 300 volts D. C. |
| Voltage source 52 | 300 volts D. C. |

It should be noted that the circuits which comprise the signal limit switches are relatively simple and reliable types of circuits. The reliability of the system, of course, depends heavily upon the reliability of the signal limit switches and the associated circuits. If the reliability of these circuits are not good, then the entire system, of course would be unsatisfactory.

The invention thus provides a relatively simple method of improving reliability of communication circuits.

It should be understood that numerous modifications may be made of the specific embodiments above described without deviating from the broader, generic aspect of the invention.

I claim:

1. The combination of a signal input circuit, a signal output circuit, at least three parallel signal channels coupled between said input and output circuits, and averaging means in the outputs of said channels for averaging the signals fed thereto, each of said averaging means including means which disconnects from the averaging means and from the signal output circuit the channel having a signal which substantially disagrees from the signals of the majority of the other channels having similar signals, the disconnecting means comprising a plurality of diodes arranged in a bridge circuit.

2. In a circuit including a signal source and an output circuit which is to be coupled to said signal source, a network to be coupled between said signal source and said output circuit for insuring that the signal from said signal source is fed to said output circuit without distortion, said network comprising at least three parallel signal channels, each channel having an input adapted to be connected to the signal source, and comparator circuit means associated with each channel and connected to said signal output circuit through an averaging circuit for limiting any voltage in the output of said signal output circuit to a magnitude comparable with the average voltage indicated by said averaging circuit, whereby the contribution of any channel signal which substantially differs from the majority of the other channel signals which are comparable will be eliminated from the average indicated by said averaging circuit, said comparator circuit means including a source of positive direct-current voltage, a source of negative direct-current voltage of the same magnitude as said positive voltage, similar impedance elements connected to the positive and negative terminals respectively of said voltage sources, a first pair of diodes in series with each other and connected to and between said impedances, a second pair of diodes in series with each other and connected to and between said impedances, each pair of diodes being in parallel with the other pair of diodes, a signal input terminal at the junction of the first pair of diodes, and a signal output terminal at the junction of the second pair of diodes, said averaging circuit comprising similar resistances connecting said output terminals in the respective channels to a common point in said signal output circuit, said comparator circuit means being adapted to limit the voltage across said output terminal thereof to a given minimum deviant value whereby the average voltage indicated by said averaging circuit will not be greatly affected by a large minority deviant signal in a minority of said channels.

3. The structure of claim 1, characterized in that all averaging circuit parameters provide together an overall circuit bandwidth of about one megacycle per second, whereby a new average quantity may be determined as often as about every microsecond.

4. The structure of claim 2, characterized in that all averaging circuit parameters provide together an overall circuit bandwidth of about one megacycle per second, whereby a new average quantity may be determined as often as about every microsecond.

References Cited in the file of this patent

UNITED STATES PATENTS

| | | |
|---|---|---|
| 2,551,805 | McDonald | May 8, 1951 |
| 2,691,889 | Dion et al. | Oct. 19, 1954 |